United States Patent
Nakamura et al.

(10) Patent No.: US 11,123,679 B2
(45) Date of Patent: Sep. 21, 2021

(54) METHOD FOR CONCENTRATING OZONE GAS AND APPARATUS FOR CONCENTRATING OZONE GAS

(71) Applicant: IWATANI CORPORATION, Osaka (JP)

(72) Inventors: Sadaki Nakamura, Amagasaki (JP); Koichi Izumi, Amagasaki (JP); Naohisa Makihira, Tokyo (JP)

(73) Assignee: IWATANI CORPORATION, Osaka (JP)

( * ) Notice: Subject to any disclaimer, the term of this patent is extended or adjusted under 35 U.S.C. 154(b) by 232 days.

(21) Appl. No.: 16/092,220

(22) PCT Filed: Mar. 3, 2017

(86) PCT No.: PCT/JP2017/008615
§ 371 (c)(1),
(2) Date: Oct. 9, 2018

(87) PCT Pub. No.: WO2017/187787
PCT Pub. Date: Nov. 2, 2017

(65) Prior Publication Data
US 2019/0126191 A1    May 2, 2019

(30) Foreign Application Priority Data
Apr. 28, 2016 (JP) ............................. JP2016-091888

(51) Int. Cl.
*B01D 53/053* (2006.01)
*C01B 13/10* (2006.01)
(52) U.S. Cl.
CPC ............ *B01D 53/053* (2013.01); *C01B 13/10* (2013.01); *B01D 2253/106* (2013.01);
(Continued)

(58) Field of Classification Search
CPC ........ B01D 53/053; B01D 53/04; C01B 13/10
See application file for complete search history.

(56) References Cited

U.S. PATENT DOCUMENTS 6,344,130 B1 *  2/2002  Koike ................ B01D 53/0462
                                                    205/626
7,819,947 B2 * 10/2010  Weist .................... B01D 53/025
                                                    95/98
(Continued)

FOREIGN PATENT DOCUMENTS

JP    H11-335102 A    12/1999
JP    H11335102 A  * 12/1999 ............. C01B 13/10
(Continued)

OTHER PUBLICATIONS

JPH11335102(A)_English Translation (Year: 1999).*
International Search Report issued in PCT/JP2017/008615; dated Apr. 18, 2017.

*Primary Examiner* — Youngsul Jeong
(74) *Attorney, Agent, or Firm* — Studebaker & Brackett PC (57) ABSTRACT

Provided is a method for concentrating ozone gas, including the steps of: allowing ozone gas to be adsorbed onto an adsorbent in a first adsorption vessel; reducing pressure in a concentration vessel in a state where the concentration vessel does not communicate with the first adsorption vessel; discharging part of gas in the first adsorption vessel; introducing first concentrated mixed gas in the concentration vessel by desorbing ozone gas in the first concentrated mixed gas and delivering the desorbed ozone gas into the concentration vessel; allowing ozone gas to be adsorbed onto an adsorbent in a second adsorption vessel; and introducing second concentrated mixed gas into the concentration vessel in a state where the concentration vessel into which the first concentrated mixed gas is introduced and the (Continued)

second adsorption vessel that houses an adsorbent. Also provided is an apparatus for concentrating ozone gas for implementing the method.

9 Claims, 5 Drawing Sheets (52) U.S. Cl.
CPC .... *B01D 2256/14* (2013.01); *B01D 2257/104* (2013.01); *B01D 2259/403* (2013.01); *B01D 2259/40062* (2013.01)

(56) References Cited

U.S. PATENT DOCUMENTS

| | | | |
|---|---|---|---|
| 8,409,520 B2 * | 4/2013 | Ota | B01D 53/047 422/186.11 |
| 2010/0005961 A1 | 1/2010 | Koike et al. | |
| 2013/0061750 A1 | 3/2013 | Makihira et al. | |

FOREIGN PATENT DOCUMENTS

| | | |
|---|---|---|
| JP | 2002-128509 A | 5/2002 |
| JP | 2013-056810 A | 3/2013 |
| WO | 2008/062534 A1 | 5/2008 |

\* cited by examiner

METHOD FOR CONCENTRATING OZONE GAS AND APPARATUS FOR CONCENTRATING OZONE GAS

TECHNICAL FIELD

The present invention relates to a method for concentrating ozone gas and an apparatus for concentrating ozone gas.

BACKGROUND ART

Ozone gas is strongly oxidative and shows high deodorizing performance and high sterilizing performance. In addition, decomposed ozone gas is no longer toxic. Thus, ozone gas has been widely used as a deodorant or a bactericide, or an agent for oxidative treatment of semiconductors.

For example, ozone gas can be generated by electric discharge in an atmosphere containing oxygen gas. The concentration in thus-generated ozone gas, however, is low. Thus, ozone in the obtained crude gas needs to be concentrated in order to increase the ozone concentration for practical use. One proposed example of such a method for concentrating ozone gas is a method for concentrating and purifying ozone gas by allowing crude ozone gas to be adsorbed onto an adsorbent in an adsorption column and then reducing the pressure in the adsorption column by a vacuum pump connected to the adsorption column, to thereby desorb ozone gas (see, for example, Patent Literature 1).

Another proposed example of such a method is a method in which the pressure in an adsorption column is reduced by a vacuum pump connected to the adsorption column, so that ozone gas adsorbed onto an adsorbent in the adsorption column is desorbed, and then the desorbed ozone gas is delivered to a buffer tank disposed at a downstream side of the vacuum pump (see, for example, Patent Literature 2).

CITATION LIST

Patent Literatures

Patent Literature 1: JP 2013-56810 A
Patent Literature 2: WO 2008/062534

SUMMARY OF INVENTION

Problem to be Solved by the Invention

Existing methods for concentrating ozone gas, however, have some problems. For example, the methods described in the above Patent Literatures 1 and 2 each include a step of reducing pressure in the adsorption column using the vacuum pump for the purpose of desorbing ozone gas from the adsorbent in the adsorption column Ozone gas concentrated in the adsorption column then passes through the inside of the vacuum pump, and thus, ozone resistance of the pump in a portion which can be exposed to ozone gas, especially in a movable portion which can be exposed to ozone gas, may become an issue in some cases. Consequently, selection of components made of a special material may be required and the frequencies of maintenance including repairing and replacement of components of the pump increases, which impedes stable operation in some cases.

Therefore, one of the purposes of the present invention is to provide a method for concentrating ozone gas and an apparatus for concentrating ozone gas which can ensure stable operation.

Solution to the Problem

A method for concentrating ozone gas according to the present invention includes the steps of: allowing ozone gas to be adsorbed onto an adsorbent in a first adsorption vessel; reducing a pressure in a first concentration vessel; discharging part of gas in the first adsorption vessel; introducing first concentrated mixed gas from the first adsorption vessel into the first concentration vessel; allowing ozone gas onto another adsorbent in a second adsorption vessel; and introducing second concentrated mixed gas from the second adsorption vessel to the first concentration vessel.

In the step of allowing ozone gas to be adsorbed onto an adsorbent in a first adsorption vessel, ozone gas-containing raw material mixed gas is introduced into the first adsorption vessel that houses an adsorbent, so as to allow ozone gas to be adsorbed on an adsorbent in the first adsorption vessel. In the step of reducing pressure in the first concentration vessel, pressure in the first concentration vessel is reduced in a state where the first concentration vessel does not communicate with the first adsorption vessel. In the step of discharging part of gas in the first adsorption vessel, gas in the adsorption vessel that houses the adsorbent onto which the ozone gas is adsorbed is exhausted, to thereby discharge part of gas in the adsorption vessel. In the step of introducing a first concentrated mixed gas into the first concentration vessel, the mode of the apparatus is switched to a state where the first concentration vessel with reduced inner pressure communicates with the first adsorption vessel from which part of gas therein is exhausted. Thus, ozone gas adsorbed on the adsorbent in the first adsorption vessel is desorbed from the adsorbent due to the pressure difference between the pressure in the first concentration vessel and the pressure in the first adsorption vessel, and desorbed ozone gas is delivered into the first concentration vessel. As a result, first concentrated mixed gas having a higher ozone gas concentration than the raw material mixed gas is introduced into the first concentration vessel. In the step of allowing ozone gas to be adsorbed onto an adsorbent in a second adsorption vessel, ozone gas-containing raw material gas is introduced into the second adsorption vessel that is different from the first adsorption vessel, so as to allow ozone gas to be adsorbed on the adsorbent in the second adsorption vessel. In the step of introducing a second concentrated mixed gas from the second adsorption vessel into the first concentration vessel, the mode of the apparatus is switched to a state where the first concentration vessel into which the first concentrated mixed gas is introduced and the second adsorption vessel that houses an adsorbent onto which ozone gas is adsorbed. Thus, ozone gas adsorbed on the adsorbent in the second adsorption vessel is desorbed from the adsorbent due to the pressure difference between the pressure in the first concentration vessel and the pressure in the second adsorption vessel, and desorbed ozone gas is delivered into the first concentration vessel. As a result, second concentrated mixed gas, which has an ozone concentration that is lower than that in the first concentrated mixed gas but higher than that in the raw material mixed gas, is introduced into the second concentration vessel.

In the method for concentrating ozone gas according to the present invention, the internal pressure of the first concentration vessel is reduced in a state where the first concentration vessel does not communicate with any adsorption vessel, and then the mode of the apparatus is switched to the state where the concentration vessel communicates with the first or the second adsorption vessel such that concentrated mixed gas is introduced into the first concentration vessel. Thus, the method according to the present invention enables to introduce concentrated mixed gas into the concentration vessel without passing ozone through the inside of a pressure-reducing device such as a vacuum pump. This reduces the frequency of maintenances, such as repairing and replacing of a pressure-reducing device like a vacuum pump and ensures stable operation.

In the method for concentrating ozone gas according to the present invention, two steps are performed as the steps for introducing concentrated mixed gas into the first concentration vessel. The first step is for introducing a first concentrated mixed gas including high concentration ozone into a first concentration vessel in a state where the first concentration vessel with reduced inner pressure communicates with the first concentration adsorption vessel from which part of gas therein is exhausted. The second step is for introducing a sufficient amount of a second concentrated mixed gas into a first concentration vessel by switching the mode of the apparatus to a state where the first concentration vessel into which the first concentrated mixed gas is introduced communicates with the second adsorption vessel that houses an adsorbent onto which ozone gas is adsorbed. By combining these two steps, gas including high concentration ozone can be collected in an amount sufficient for supplying the gas to a supply destination.

The step of discharging part of the gas in the adsorption vessel may include exhausting gas to the outside while preventing gas in the first adsorption vessel from reaching the first concentration vessel. This exhaustion of gas enables gas including only low-concentration ozone to be discarded while preventing the gas from reaching the first concentration vessel. Consequently, the gas including high-concentration ozone can be collected in the first concentration vessel.

The step of discharging part of the gas in the first adsorption vessel may include discharging part of gas in the first adsorption vessel that houses the adsorbent onto which the ozone gas is adsorbed by allowing the adsorption vessel to be opened to the outside air. This enables to perform the step of discharging part of the gas in the adsorption vessel in a simple facility.

The step of discharging part of the gas in the first adsorption vessel may include discharging part of gas in the first adsorption vessel that houses the adsorbent onto which the ozone gas is adsorbed such that pressure in the first adsorption vessel should be −80 kPa·G or less while preventing the part of gas from reaching the first concentration vessel. By discharging the part of gas such that the pressure in the first adsorption vessel should be −80 kPa·G or less, the ozone gas concentration in the first adsorption vessel can be increased. Consequently, the gas including high-concentration ozone can be introduced into the first concentration vessel.

A method for concentrating ozone gas according to the present invention may further include a step of reducing pressure in the second concentration vessel that is different from the first concentration vessel in a state where the second concentration vessel does not communicate with either of the first and the second adsorption vessels. In this case, the step of discharging part of gas in the first adsorption vessel may include a step of introducing part of gas in the first adsorption vessel into the second concentration vessel by desorbing ozone gas adsorbed onto the adsorbent in the first adsorption vessel using the pressure difference between the pressure in the second concentration vessel with reduced internal pressure and the first adsorption vessel that houses an adsorbent onto which ozone gas is adsorbed in a state where the second concentration vessel communicates with the first adsorption vessel, and then delivering the desorbed ozone gas into the second concentration vessel. The ozone concentration in gas discharged in an early stage of the discharging step is relatively low. Thus, by discharging gas including low concentration ozone from the first adsorption vessel, ozone gas including higher concentration ozone can be finally collected from the first adsorption vessel. The gas delivered from the first adsorption vessel to the second concentration vessel can be used for pressurizing the inside of the second concentration vessel. Thus, the amount of ozone discarded without being used can be reduced.

The step of introducing the first concentrated mixed gas into the first concentration vessel or the step of introducing the second concentrated mixed gas into the first concentration vessel may be performed without heating the first and the second adsorption vessels. Any heating device is necessary to heat the adsorption vessel. Thus, the production apparatus may become complex when heating is necessary. When heating can be omitted, no complex production apparatus for heating is needed, and the facility can be simplified.

The step of discharging part of concentrated mixed gas may include discharging part of gas in the first adsorption vessel that houses an adsorbent onto which the ozone gas is adsorbed into a third adsorption vessel that houses an adsorbent in a state where the first adsorption vessel communicates with the third adsorption vessel. When the first adsorption vessel communicates with the third adsorption vessel, part of gas in the first adsorption vessel, the inside of which is pressurized by adsorption of ozone gas on the adsorbent, is delivered to the third adsorption vessel. The ozone concentration in gas discharged in an early stage of the discharging step is relatively low. Thus, by discharging gas including low concentration ozone from the first adsorption vessel, ozone gas including higher concentration ozone can be finally collected from the first adsorption vessel. The gas delivered to the third adsorption vessel is used for pressurizing the inside of the third adsorption vessel. In addition, ozone included in the gas is adsorbed onto the adsorbent in the third adsorption vessel. Thus, the amount of discarded ozone without being used can be reduced.

The apparatus for concentrating ozone gas according to the present invention includes first and second adsorption vessels, a first concentration vessel, a first pressure-reducing device, and a channel control device. The first and second adsorption vessels each house an adsorbent for adsorbing ozone gas from ozone gas-containing raw material mixed gas introduced thereinto. The first concentration vessel is connected to both of the first and the second adsorption vessels. The first pressure-reducing device is connected to the first concentration vessel and is capable of the pressure in the first concentration vessel. The channel control device switches modes of communication state of the first and the second adsorption vessels, the first concentration vessel, and the first pressure-reducing device.

In addition, the channel control device interchangeably switches the following six modes: a first mode for allowing ozone gas to be adsorbed onto an adsorbent in a first adsorption vessel by introducing raw material mixed gas that includes ozone gas into a first adsorption vessel that houses an adsorbent; a second mode for reducing pressure in the first concentration vessel in a state where the first concentration vessel does not communicate with the first and second adsorption vessels; a third mode for discharging part of gas in the first adsorption vessel that houses the adsorbent onto which ozone gas is adsorbed by exhausting gas in the first adsorption vessel to the outside; a fourth mode for introducing concentrated mixed gas including ozone gas with a higher ozone gas concentration than the raw material mixed gas into the first concentration vessel by desorbing ozone gas adsorbed onto the adsorbent in the first adsorption vessel using the pressure difference between the first concentration vessel with reduced internal pressure and the first adsorption vessel from which part of gas therein is discharged in a state where the first concentration vessel communicates with the first adsorption vessel, and then delivering the desorbed ozone gas into the first concentration vessel; a fifth mode for allowing ozone gas to be adsorbed onto an adsorbent in a second adsorption vessel by introducing raw material mixed gas that includes ozone gas into a second adsorption vessel that houses an adsorbent; and a sixth mode or introducing a second concentrated mixed gas including ozone gas with an ozone gas concentration that is lower than that of the first concentrated mixed gas into the first concentration vessel but is higher than that of the raw material mixed gas by desorbing ozone gas adsorbed onto the adsorbent in the second adsorption vessel using the pressure difference between the first concentration vessel into which a first concentrated mixed gas has been introduced and the second adsorption vessel that houses the adsorbent onto which ozone gas is adsorbed in a state where the first concentration vessel communicates with the second adsorption vessel, and then delivering the ozone gas into the first concentration vessel.

In the apparatus for concentrating ozone gas according to the present invention, the internal pressure of the first concentration vessel is reduced in a state where the first concentration vessel does not communicate with any adsorption vessel, and then the mode of the apparatus is switched to the state where the concentration vessel communicates with the first or the second adsorption vessel so that concentrated mixed gas is introduced into the first concentration vessel. Thus, the method according to the present invention enables to introduce concentrated mixed gas into the concentration vessel without passing ozone through the inside of a pressure-reducing device such as a vacuum pump. This reduces the frequency of maintenances, such as repairing and replacing of a pressure-reducing device like a vacuum pump and ensures stable operation.

The apparatus for concentrating ozone gas according to the present invention switches the above six states interchangeably by the channel control device. Among them, in the fourth mode, the first concentrated mixed gas including ozone gas with a higher ozone gas concentration than the raw material mixed gas is introduced into the first concentration vessel in a state where the first concentration vessel with reduced internal pressure communicates with the first adsorption vessel, from which part of gas is discharged. In the sixth mode, a sufficient amount of the second concentrated mixed gas is introduced into the first concentration vessel in a state where the first concentration vessel into which the first concentrated mixed gas has been introduced communicates with the second adsorption vessel that houses an adsorbent onto which ozone gas is adsorbed. As a result, gas including high concentration ozone in an amount sufficient for supplying the gas can be introduced into the first concentration vessel by the apparatus for concentrating ozone gas according to the present invention.

The apparatus according to the present invention may further include an exhaust path that is connected to the first adsorption vessel and is used for exhausting gas in the first adsorption vessel while preventing the gas from reaching the first concentration vessel. The presence of this exhaust path enables gas including low concentration ozone to be discarded while preventing the gas from reaching the concentration vessel. Accordingly, gas including high concentration ozone can be collected.

The apparatus for concentrating ozone gas according to the present invention may further include a second concentration vessel that is different from the first concentration vessel and a second pressure-reducing device that is connected to the second concentration vessel and is capable of reducing pressure in the second concentration vessel. At this time, the channel control device may switch between a mode for reducing pressure in a second concentration vessel in a state where the second concentration vessel does not communicate with the first and the second adsorption vessels; and a mode for introducing part of gas in the first adsorption vessel into the second concentration vessel by desorbing ozone gas adsorbed onto the adsorbent in the first adsorption vessel using the pressure difference between the pressure in the second concentration vessel with reduced internal pressure and the first adsorption vessel that houses an adsorbent onto which ozone gas is adsorbed in a state where the second concentration vessel communicates with the first adsorption vessel, and then delivering the desorbed ozone gas into the second concentration vessel. Thus, part of gas in the first adsorption vessel is introduced into the second concentration vessel. As described above, the ozone concentration in gas discharged in an early stage of the discharging step is relatively low. Thus, by discharging gas including low concentration ozone from the first adsorption vessel, ozone gas including higher concentration ozone can be finally collected from the first adsorption vessel. The gas delivered from the first adsorption vessel to the second concentration vessel can be used for pressurizing the inside of the second concentration vessel. Thus, the amount of ozone discarded without being used can be reduced.

Effects of the Invention

As is clear from the above description, the present invention can provides a method for concentrating ozone gas and an apparatus for concentrating of the present invention which enable stable operation and can collect ozone-containing gas with a high ozone concentration in a sufficient amount for supplying a supply destination.

DESCRIPTION OF EMBODIMENTS

Embodiments of the present invention will hereinafter be described with reference to the accompanying drawings, wherein the same or similar reference numerals designate corresponding or identical elements throughout the various drawings.

First Embodiment

1. Configuration of an Apparatus for Concentrating Ozone Gas

Figure 1:
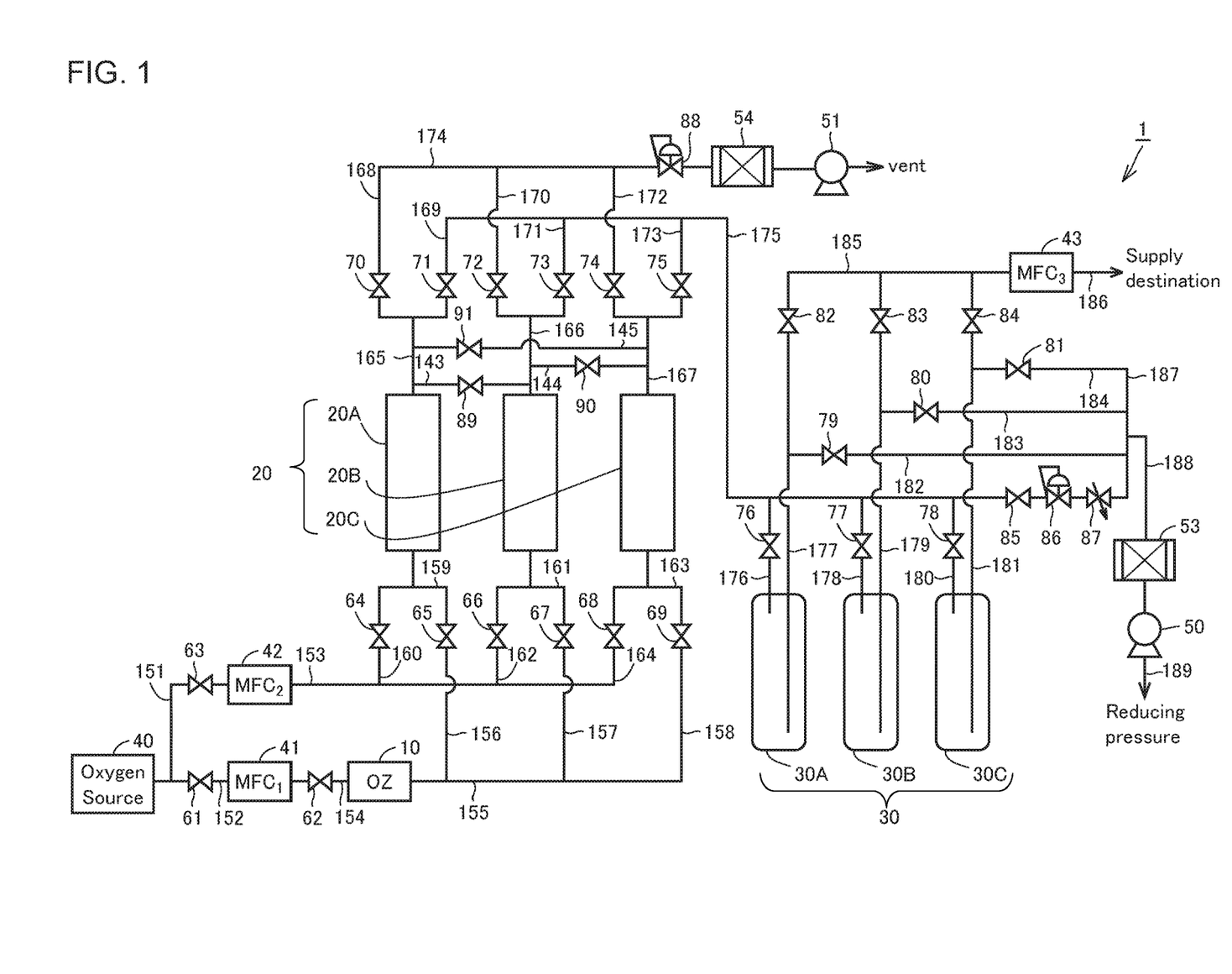
FIG. 1 is a view illustrating a connected state of pipes in a representative configuration of an apparatus for concentrating ozone gas according to a first embodiment.
Figure 2:
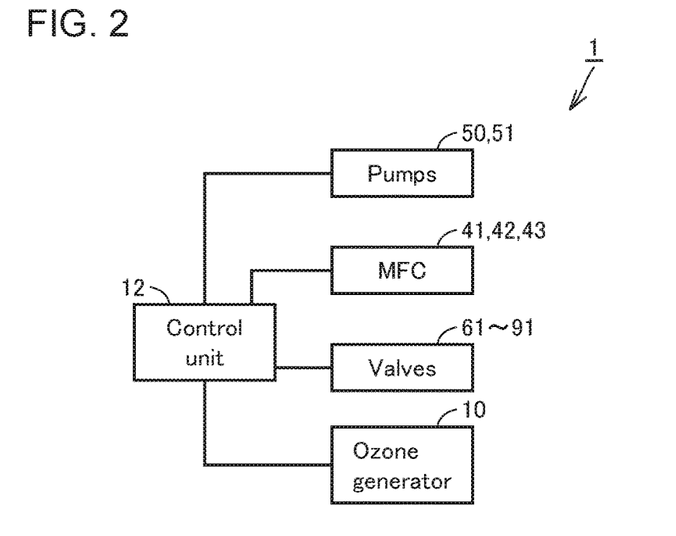
FIG. 2 is a view illustrating a connected state for controlling units in a representative configuration of an apparatus for concentrating ozone gas according to the first embodiment.

FIG. 1 illustrates a connected state of pipes of an apparatus 1 for concentrating ozone. The apparatus 1 is an apparatus for concentrating ozone according to a first embodiment. FIG. 2 illustrates a connected state for controlling units in the apparatus 1, which is an apparatus for concentrating ozone gas according to the first embodiment, for concentrating ozone. With reference to FIG. 1, the apparatus 1 includes an oxygen source 40, an ozone generator 10, adsorption vessels 20A, 20B, and 20C, and concentration vessels 30A, 30B, and 30C. An outline of the apparatus 1 will be explained with reference to FIG. 1. In the apparatus 1, an oxygen gas is first sent from the oxygen source 40 to the ozone generator 10. The oxygen gas sent from the oxygen source 40 is partially converted to ozone in the ozone generator 10, and ozone-containing raw material mixed gas is thus generated. The ozone-containing raw material mixed gas is sent from the ozone generator 10 to the adsorption vessel 20A, 20B, or 20C. Ozone in the raw material mixed gas sent to the adsorption vessel 20A, 20B, or 20C is adsorbed onto an adsorbent in the adsorption vessel 20A, 20B, or 20C. Ozone adsorbed onto the adsorbent is then desorbed, to generate concentrated mixed gas including ozone with a higher ozone concentration in the adsorption vessel 20A, 20B, or 20C. The concentrated mixed gas is introduced from the adsorption vessel 20A, 20B, or 20C to the concentration vessel 30A, 30B, or 30C. The concentrated mixed gas introduced into the concentration vessel 30A, 30B, or 30C is supplied to a supply destination. Details will be explained hereinafter with reference to FIG. 1.

The oxygen source 40 is connected to a first mass flow controller 41 via a pipe 152. As the oxygen source 40, a cylinder, a liquid gas container (LGC), or a cold evaporator (CE) each containing oxygen may be employed. The pipe 152 is an outflow path of oxygen gas from the oxygen source 40. The pipe 152 is provided with a valve 61. The first mass flow controller 41 is connected to a pipe 154. The pipe 154 is provided with a valve 62. The pipe 154 is connected to the ozone generator 10. The pipe 154 is an inflow path of raw material gas to the ozone generator 10. In this manner, the oxygen source 40 is connected to the ozone generator 10 through the pipes.

The ozone generator 10 is connected to a pipe 155. The pipe 155 is an outflow path of ozone-containing raw material mixed gas that has been generated in the ozone generator 10. The pipe 155 is connected to a pipe 156, a pipe 157, and a pipe 158. The pipe 156 is provided with a valve 65. The pipe 157 is provided with a valve 67. The pipe 158 is provided with a valve 69.

A pipe 151 is connected to the pipe 152 between a position at which the valve 61 is disposed on the pipe 152 and a position at which the pipe 152 is connected to the oxygen source 40. The pipe 151 is connected to a second mass flow controller 42. The pipe 151 is provided with a valve 63. The second mass flow controller 42 is connected to a pipe 153. The pipe 153 is connected to a pipe 160, a pipe 162, and a pipe 164. The pipe 160 is provided with a valve 64. The pipe 162 is provided with a valve 66. The pipe 164 is provided with a valve 68.

The pipe 156 and the pipe 160 are connected to a pipe 159. The pipe 157 and the pipe 162 are connected to a pipe 161. The pipe 158 and the pipe 164 are connected to a pipe 163. The pipe 159 is connected to the first adsorption vessel 20A. The pipe 161 is connected to the first adsorption vessel 20B. The pipe 163 is connected to the third adsorption vessel 20C. The first adsorption vessel 20A houses an adsorbent (a first adsorbent) made of silica gel. The second adsorption vessel 20B houses an adsorbent (a second adsorbent) made of silica gel. The third adsorption vessel 20C houses an adsorbent (a third adsorbent) made of silica gel. Silica gel constituting each of the first adsorbent, the second adsorbent, and the third adsorbent has a purity of 99.99% by mass or more, for example.

The first adsorption vessel 20A is connected to a pipe 165. The second adsorption vessel 20B is connected to a pipe 166. The third adsorption vessel 20C is connected to a pipe 167. The pipe 165 and the pipe 166 are connected to each other via a pipe 143. The pipe 143 is provided with a valve 89. The pipe 166 and the pipe 167 are connected to each other via a pipe 144. The pipe 144 is provided with a valve 90. The pipe 165 and the pipe 167 are connected to each other via a pipe 145. The pipe 145 is provided with a valve 91.

The pipe 165 is connected to a pipe 168 and a pipe 169. The pipe 166 is connected to a pipe 170 and a pipe 171. The pipe 167 is connected to a pipe 172 and a pipe 173. The pipe 168 is provided with a valve 70. The pipe 169 is provided with a valve 71. The pipe 170 is provided with a valve 72. The pipe 171 is provided with a valve 73. The pipe 172 is provided with a valve 74. The pipe 173 is provided with a valve 75. The pipe 168, the pipe 170, and the pipe 172 are connected to a pipe 174. The pipe 169, the pipe 171, and the pipe 173 are connected to a pipe 175.

An end of the pipe 174, located on the opposite side of the other end that is connected to the pipe 168, the pipe 170, and the pipe 172, constitutes an exhaust outlet for discharge gas in the apparatus 1. The pipe 174 is provided with a back pressure valve 88, an ozone decomposer 54, and an exhaust pump 51. The back pressure valve 88 controls the pressure in a step for discharging part of gas in the adsorption vessel 20. The ozone decomposer 54 decomposes ozone contained in an atmosphere exhausted from the exhaust path. When no pressure control is needed (e.g., a case where an adsorption vessel is opened to the outside air) in the process for discharging part of gas in the adsorption vessel 20, the back pressure valve 88 and the exhaust pump 51 may be omitted.

The pipe 175 is connected to a pipe 176, a pipe 178, and a pipe 180. The pipe 176 is disposed so as to extend to the inside of the first concentration vessel 30A. The pipe 176 is provided with a valve 76. The pipe 178 is disposed so as to extend to the inside of the second concentration vessel 30B. The pipe 178 is provided with a valve 77. The pipe 180 is disposed so as to extend to the inside of the third concentration vessel 30C. The pipe 180 is provided with a valve 78.

The pipe 175 is provided with a valve 85, a back pressure valve 86, and a throttle valve 87. The back pressure valve 86 and the throttle valve 87 control the pressure and the flow rate, respectively, of concentrated mixed gas upon desorbing ozone gas.

The pipe 177 is disposed so as to extend from the inside to the outside of the first concentration vessel 30A. The pipe 177 is provided with a valve 82. The pipe 179 is disposed so as to extend from the inside to the outside of the second concentration vessel 30B. The pipe 179 is provided with a valve 83. The pipe 181 is disposed so as to extend from the inside to the outside of the third concentration vessel 30C.

The pipe 181 is provided with a valve 84. The pipe 177, the pipe 179, and the pipe 181 are connected to a pipe 185.

Each of the concentration vessels 30A, 30B, and 30C receives concentrated mixed gas including ozone gas desorbed from the first adsorbent in the first adsorption vessel 20A, the second adsorbent in the second adsorption vessel 20B, or the third adsorbent in the third adsorption vessel 20C. Each of the concentration vessels 30A, 30B, and 30C is a vessel made of ozone-resistant material (e.g., an ozone-resistant resin or metal).

The pipe 185 is connected to the third mass flow controller 43. The third mass flow controller 43 is connected to a pipe 186. The pipe 186 is connected to a discharge outlet (not shown) for discharging ozone gas to a supply destination.

The pipe 177 is connected to a pipe 182. The pipe 182 is provided with a valve 79. The pipe 179 is connected to a pipe 183. The pipe 183 is provided with a valve 80. The pipe 181 is connected to a pipe 184. The pipe 184 is provided with a valve 81. The pipe 175, the pipe 182, the pipe 183, and the pipe 184 are connected to a pipe 187. The pipe 187 is connected to a pipe 188. The pipe 188 is provided with an ozone decomposer 53 and a pump 50 for reducing the pressure in a concentration vessel as the first pressure-reducing device. The pump 50 for reducing the pressure in a concentration vessel is connected to a first concentration vessel selected from the concentration vessels 20A, 20B, and 20C and functions as a first pressure-reducing device capable of reducing the pressure in the first concentration vessel. Although not illustrated, a plurality of pumps may be disposed as the pump 50 for reducing the pressure in a concentration vessel. That is, a second pressure-reducing device that is connected to the second concentration vessel and is capable of reducing the pressure in the second concentration vessel may be further disposed. For example, concentration vessels 30A, 30B, and 30C may share one pressure-reducing pump. In this case, the pump 50 for reducing the pressure in a concentration vessel functions as the first pressure-reducing device and as the second pressure-reducing device. The concentration vessels 30A, 30B, and 30C may each be provided with corresponding pumps for reducing pressure (not shown).

The pump 50 for reducing the pressure in a concentration vessel is connected to a pipe 189. The pipe 189 constitutes an exhaust pipe for exhausting an atmosphere in the concentration vessel 30A, 30B, or 30C during reduction of the pressure in the vessel. The ozone decomposer 53 decomposes ozone contained in an atmosphere to be exhausted.

Next, with reference to FIG. 2, a connection state for controlling units of the apparatus 1, which is an apparatus for concentrating ozone according to the first embodiment, will be described. With reference to FIG. 2, the apparatus 1 for concentrating ozone includes a control unit 12, the pumps 50 and 51, the valves 61-91, the ozone generator 10, the first mass flow controller 41 as a first flow rate adjusting unit, the second mass flow controller 42 as a second flow rate adjusting unit, and the third mass flow controller 43 as a third flow rate adjusting unit.

The control unit 12 functions as a path controller, and controls the whole apparatus for concentrating ozone gas, including a route from an ozone gas source to a supply destination. The control unit 12 controls an opening/closing state of each valve to thereby control the paths. The control unit 12 controls operations of the pump 50 for reducing the pressure in a concentration vessel as a pressure-reducing device and the exhaust pump 51 as an exhaust device. The control unit 12 also controls the operation of the ozone generator 10.

With reference to FIGS. 1 and 2, the pump 50 for reducing the pressure in a concentration vessel is connected to the pipe 189 constituting an exhaust pipe for exhausting an atmosphere in the concentration vessel. When the pump 50 for reducing the pressure in a concentration vessel is activated and the valve 79, 80, or 81 corresponding to the concentration vessel 30A, 30B, or 30C is opened, the pressure in the concentration vessel 30A, 30B, or 30C is thereby reduced. The exhaust pump 51 is disposed on the pipe 174 provided with a vent for exhausting gas to the outside. When the exhaust pump 51 is activated and the valve 70, 72, or 74 corresponding to the adsorption vessel 20A, 20B, or 20C is opened, part of gas in the adsorption vessel 20A, 20B, or 20C is thereby exhausted to the outside.

With reference to FIGS. 1 and 2, the first mass flow controller 41 controls a flow rate of oxygen gas supplied from the oxygen source 40 to the ozone generator 10. The second mass flow controller 42 controls a flow rate of supplied oxygen gas, as purge gas, from the oxygen source 40 to the adsorption vessel 20A, 20B, or 20C. The third mass flow controller 43 controls a flow rate of concentrated mixed gas supplied from the concentration vessel 30A, 30B, or 30C to a supply destination.

The valves 61-91 can be opened and closed so that channels are controlled by opening and closing the valves.

The ozone generator 10 includes an electric discharge unit including a plurality of electrodes. Part of oxygen is converted into ozone by electric discharging between the electrodes of the discharge unit in oxygen gas introduced in the ozone generator 10. In this manner, ozone-containing raw material mixed gas is generated.

2. Method for Concentrating Ozone Gas

Figure 3:
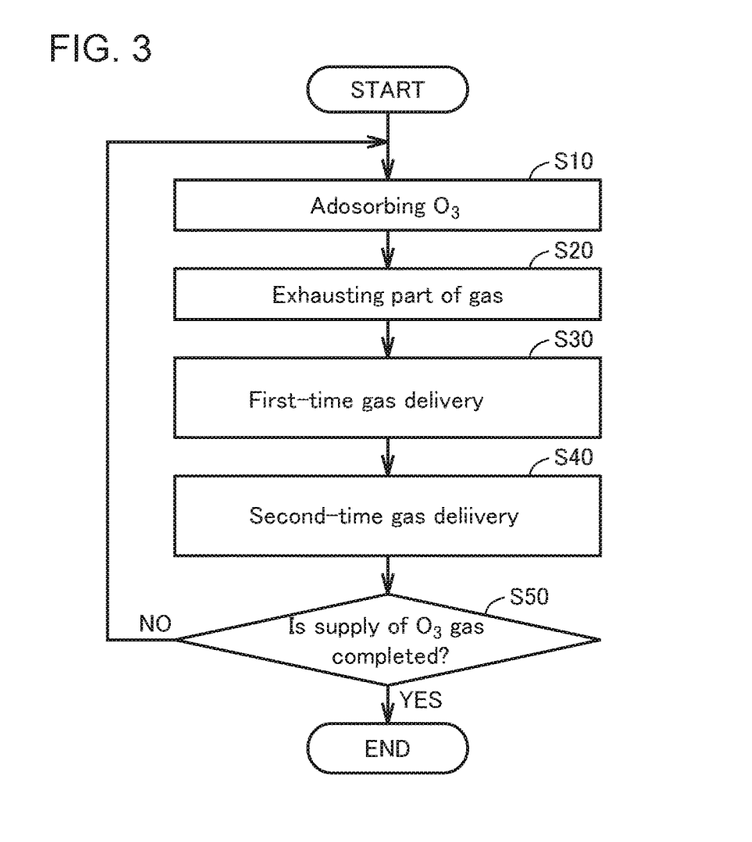
FIG. 3 is a flowchart illustrating an example for controlling an adsorption vessel in the first embodiment.
Figure 4:
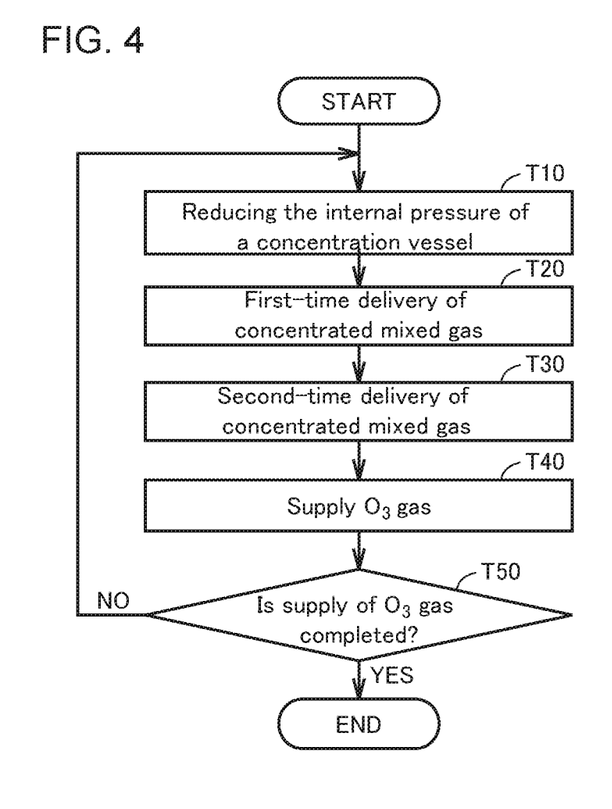
FIG. 4 is a flowchart illustrating an example for controlling a concentration vessel in the first embodiment.
Figure 5:
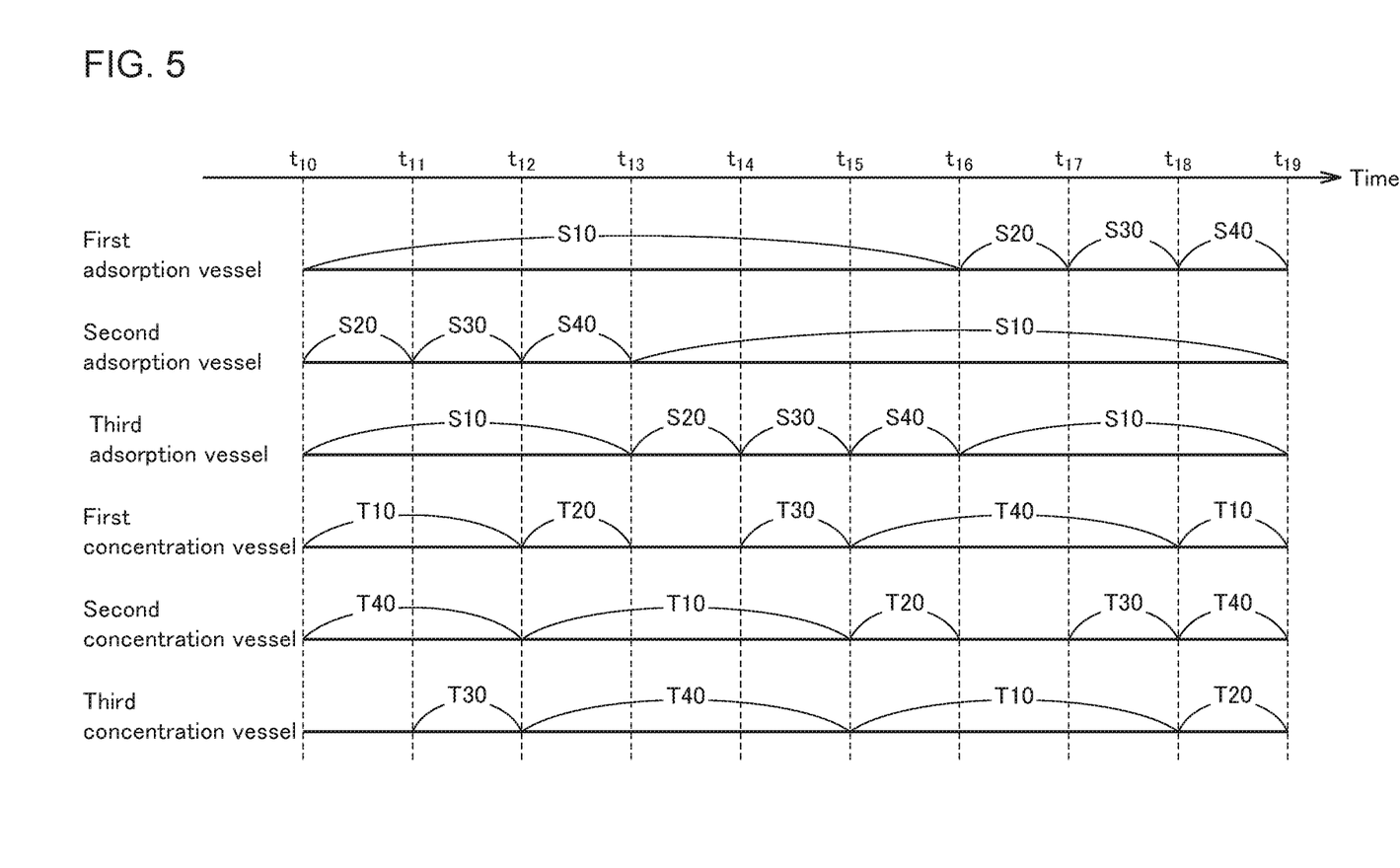
FIG. 5 is a timing chart illustrating a representative procedure for concentrating ozone gas in the first embodiment.

With reference now to FIGS. 1-5, a method for concentrating ozone gas according to the first embodiment of the present invention will be described. FIG. 3 is a flowchart illustrating an example for controlling the adsorption vessel in the first embodiment. FIG. 4 is a flowchart illustrating an example for controlling the concentration vessel in the first embodiment. FIG. 5 is a timing chart illustrating an example of a procedure for concentrating ozone gas in the first embodiment. This concentrating method is performed without heating the adsorption vessels 20.

(1) Explanation on the Flow for Controlling an Adsorption Vessel

A flow for controlling the adsorption vessels 20A, 20B, and 20C will now be described. With reference to FIG. 3, steps S10-S50 are performed for each of the adsorption vessels 20A, 20B, and 20C. A flow for controlling the first adsorption vessel 20A of the adsorption vessels 20A, 20B, and 20C will be described as a representative example FIGS. 1 and 3 are now referred. In the first adsorption vessel 20A, ozone gas is first adsorbed onto the first adsorbent in the first adsorption vessel 20A (step S10). In the step S10, the valve 61 and the valve 62 are first opened. Accordingly, oxygen gas supplied from the oxygen source 40 reaches the first mass flow controller 41 through the pipe 152. The oxygen gas is sent to the ozone generator 10 through the pipe 154 at a desired flow rate adjusted by the first mass flow controller 41. Ozone gas is generated by electric discharging in the oxygen gas that has reached the ozone generator 10. When the valve 65 is then opened, a raw material mixed gas, which contains the ozone gas generated in the ozone generator 10, is discharged from the ozone generator 10 and is introduced into the first adsorption vessel 20A through the pipe 155, the pipe 156, and the pipe 159. The introduction of the raw material mixed gas into the first adsorption vessel 20A is continued, and when necessary, the valve 70 (or an unillustrated distribution pipe opening/closing valve for opening and closing a distribution pipe connected to the pipe 165 in order to distribute (or pass) ozone in the first adsorption vessel 20A) is opened at a predetermined timing so that the internal pressure of the first adsorption vessel 20A is kept at a predetermined pressure. When a predetermined timing comes after the start of introduction of ozone gas-containing raw material mixed gas into the first adsorption vessel 20A, the valve 65 and the valve 70 (or the distribution pipe opening/closing valve) are closed.

The first adsorbent housed in the first adsorption vessel 20A selectively adsorbs ozone in the introduced raw material mixed gas. Consequently, part of gas not adsorbed onto the first adsorbent includes only low concentration ozone. Thus, the gas in the first adsorption vessel 20A is exhausted to the outside so as to discard this gas including low concentration ozone and to collect only part of the gas including a high concentration of ozone (step S20). Examples of this exhaust method include the following methods.

(A) Exhausting Method Including Opening the Apparatus to the Air

The valve 70 is opened while the valves 64, 65, and 71 are remained closed. When the back pressure valve 88 is opened, the first adsorption vessel 20A is opened to the outside air through the pipes 165, 168, and 174. Since the pressure in the first adsorption vessel 20A is higher than an atmospheric pressure because of the introduced raw material mixed gas, part of the gas in the first adsorption vessel 20A is discharged from the higher pressure first adsorption vessel 20A to the atmospheric pressure outside. At this time, since ozone is adsorbed onto the first adsorbent, the part of gas discharged here includes low concentration ozone. When this method is employed, the back pressure valve 88 and the exhaust pump 51 may be omitted and the apparatus can be thus simplified.

(B) Exhausting Method Including Reducing the Pressure in First Adsorption Vessel 20A to −80 kPa·G or Less The valve 70 is opened while the valves 64, 65, and 71 are remained closed. The exhaust pump 51 may be activated so that part of gas in the first adsorption vessel 20A can be exhausted while the internal pressure of the first adsorption vessel 20A is controlled to be lower than the atmospheric pressure, specifically a pressure of −80 kPa·G or less, using the back pressure valve 88. This method enables a larger amount of part of the gas including low concentration ozone in the first adsorption vessel 20A to be exhausted and only part of the gas including higher concentration ozone can be left in the first adsorption vessel 20A. Thus, as compared to the method (A) as mentioned above, concentrated mixed gas including higher concentration ozone gas can be obtained. This method can prevent such part of gas in the first adsorption vessel 20A from reaching the concentration vessels 30.

(C) Exhausting Method Including Delivering Part of Gas from a First Adsorption Vessel 20A to Another Adsorption Vessel 20B (or 20C)

First, a case where the second adsorption vessel 20B is in a state before the step S10 for adsorbing ozone is assumed. When the valve 89 is opened in this state while the valves 64, 65, 66, 67, 70, 71, 72, and 73 are remained closed, gas is discharged from the inside of the higher pressure first adsorption vessel 20A to the inside of the lower pressure second adsorption vessel 20B. When the valve 89 is kept opened, the internal pressure of the first adsorption vessel 20A finally becomes equal to the internal pressure of the second adsorption vessel 20B. Thereafter, the valve 89 is closed. Accordingly, part of gas in the first adsorption vessel 20A including low concentration ozone is delivered from the first adsorption vessel 20A to the second adsorption vessel 20B. In this manner, higher-concentration ozone gas can be collected from the first adsorption vessel 20A. The gas introduced into the second adsorption vessel 20B is used for increasing the pressure in the second adsorption vessel 20B, and ozone contained in the gas is adsorbed onto the second adsorbent that is housed in the second adsorption vessel 20B. Thus, ozone can be collected and then used without discarding the gas.

(D) Method Including Delivering Part of Gas in the First Adsorption Vessel 20A to the Pressure-Reduced Concentration Vessel 30B or 30C First, the internal pressure of the second concentration vessel 30B is reduced in a state where the second concentration vessel 30B does not communicate with any one of adsorption vessels 20A, 20B, and 20C. Next, ozone gas adsorbed onto the adsorbent in the first adsorption vessel 20A is desorbed using the pressure difference between the second concentration vessel 30B, the internal pressure of which is reduced, and the first adsorption vessel 20A that houses a adsorbent onto which ozone gas is adsorbed in a state where the second concentration vessel 30B communicates with the first adsorption vessel 20A, and the desorbed ozone gas is delivered into the second concentration vessel 30B, to thereby introduce part of gas in the first adsorption vessel 20A into the second concentration vessel 30B. In this method, the part of gas is introduced from the first adsorption vessel 20A to the second concentration vessel 30B through the pipes 165, 169, 175, and 178. Thus, the pipes 165, 169, 175, and 178 respectively constitute the exhaustion unit.

Some examples of performing the step S20 have been described above, but the methods for performing the step S20 are not limited to these examples.

Next, a first-time delivery of concentrated mixed gas is performed (step S30). The concentrated mixed gas delivered from the first adsorption vessel 20A in the first-time delivery of the concentrated mixed gas is introduced into a predetermined concentration vessel of the concentration vessels 30A, 30B, and 30C. At this time, the pressure of the concentration vessel has been reduced, and the internal pressure of the concentration vessel to which the concentrated mixed gas is introduced is kept lower than the internal pressure of the first adsorption vessel 20A. Thus, when the valve 71, which is disposed on the first adsorption vessel 20A side, and the valve 76 (or 77 or 78), which is disposed on the concentration vessel side, are opened, the concentrated mixed gas delivered from the high-pressure first adsorption vessel 20A is introduced into a low-pressure concentration vessel 30 through the pipe 175.

Next, a second-time delivery of the concentrated mixed gas is performed (step S40). The internal pressure of the concentration vessel 30 to which the concentrated mixed gas is introduced by the second-time delivery is kept much lower than the internal pressure of the vessel to which the concentrated mixed gas is introduced by the first-time delivery. Thus, ozone remained adsorbed onto the first adsorbent in the first adsorption vessel 20A and was not delivered by the first-time delivery of the concentrated mixed gas is then delivered in the second-time delivery. Note that the concentrated mixed gas is delivered in the step S40 including ozone with a higher ozone concentration than the concentrated mixed gas delivered in the step S30.

FIG. 3 is now referred. If supply of ozone gas to a supply destination has been finished (YES in the step S50), the ozone concentrating apparatus 1 is deactivated, and concentration of the ozone gas is finished. If supply of the ozone gas to a supply destination is not yet finished (NO in the step S50), operations in steps S10 through S40 are repeated again. It is noted that the step S20 of discharging part of the gas in the adsorption vessel may be omitted in this procedure.

Although the above statement is directed only to an example in the first adsorption vessel 20A as a representative example, the above-described cycle of steps S10 through S50 is performed in each of the first adsorption vessel 20A, the second adsorption vessel 20B, and the third adsorption vessel 20C. The cycles of steps S10 through S50 in the adsorption vessels are performed at shifted timings in each adsorption vessel so that concentrated mixed gas can be supplied with minimized standby time.

FIG. 5 is a timing chart illustrating an example of a procedure for concentrating ozone gas in the first embodiment. FIG. 5 is now referred. In a period from time $t_{10}$ to time $t_{13}$, the exhausting step S20 (a period from time $t_{10}$ to time $t_{11}$), the first-time delivery step S30 (a period from time $t_{10}$ to time $t_{11}$), and the second-time delivery step S40 (from time $t_{12}$ to time $t_{13}$) are performed in the second adsorption vessel 20B. Meanwhile, the adsorbing step S10 is performed in the first adsorption vessel 20A and the third adsorption vessel 20C. In a period from time $t_{13}$ to time $t_{16}$, the steps S20 through S40 are performed in third adsorption vessel 20C. At this time, the adsorbing step S10 is performed in the first adsorption vessel 20A and the second adsorption vessel 20B. In a period from time $t_{16}$ to time $t_{19}$, the steps S20 through S40 are performed in the first adsorption vessel 20A. At this time, the adsorbing step S10 is performed in the second adsorption vessel 20B and the third adsorption vessel 20C. In this manner, the above-described cycle is repeated in a state where the steps S20 through S40 are performed in one of the three adsorption vessels while the step S10 is performed in the other two adsorption vessels.

(2) Explanation on Flow for Controlling a Concentration Vessel

Next, a flow for controlling the concentration vessels 30A, 30B, and 30C will be described below. FIG. 4 is now referred. The steps T10 through T50 are performed in each of the concentration vessels 30A, 30B, and 30C. Now, a flow for controlling the first concentration vessel 30A of the concentration vessels 30A, 30B, and 30C will be described as a representative example.

First, the internal pressure of the first concentration vessel 30A is reduced (step T10). With reference to FIGS. 1 and 4, the pump 50 for reducing a concentration vessel is activated while the valve 76 and the valve 82 are remained closed. Then, the valve 79 is opened, so as to reduce the internal pressure of the first concentration vessel 30A. In this manner, an atmosphere in the first concentration vessel 30A is discharged to the outside through the pipes 177, 182, 187, 188, and 189, and pressure in the first concentration vessel 30A is reduced. The pressure in the first concentration vessel 30A is reduced to a predetermined pressure, and then the pump 50 for reducing the pressure of a concentration vessel is deactivated and the valve 79 is closed. In this manner, the inside of the first concentration vessel 30A is kept in a reduced-pressure state.

Next, a first-time delivery of concentrated mixed gas is performed (step T20). In the step T20, the valve 76 is opened so that the mode of the apparatus is switched to a state where the second adsorption vessel 20B communicates with the first concentration vessel 30A. The switching to the state where these vessels communicate with each other enables concentrated mixed gas including ozone gas with a higher ozone gas concentration than that of a raw material mixed gas to be introduced, due to a pressure difference, into the first concentration vessel 30A from the second adsorption vessel 20B through the pipe 175 and the 176. At this time, the inside of the first concentration vessel 30A is kept at a pressure lower than the internal pressure of the second adsorption vessel 20B. Thus, when the valve 76 is opened, concentrated mixed gas including high-concentration ozone gas is introduced into the first concentration vessel 30A, due to a pressure difference, from the second adsorption vessel 20B. It should be noted that the amount of the concentrated mixed gas including a high-concentration ozone gas is small, and thus, the first concentration vessel 30A is not yet sufficiently filled at the end of the first-time delivery of the concentrated mixed gas such that the inner pressure of the first concentration vessel 30A is sufficient for supplying ozone gas to a supply destination. Although the internal pressure of the first concentration vessel 30A slightly increases, the first concentration vessel 30A is kept at a pressure lower than the internal pressure of the other adsorption vessels such as the third adsorption vessel 20C.

Next, a second-time delivery of concentrated mixed gas is performed (step T30). At the time of the start of the second-time delivery of the concentrated mixed gas, the internal pressure of the first concentration vessel 30A is slightly higher than that in the first-time delivery of the concentrated mixed gas. Thus, the ozone concentration of the concentrated mixed gas to be introduced by the second-time delivery is higher than the ozone gas concentration of the raw material mixed gas but slightly lower than that of the concentrated mixed gas introduced by the first-time delivery. The second-time delivery of the concentrated mixed gas enables the first concentration vessel 30A to be filled at a pressure sufficient for supplying ozone gas to a supply destination. The concentrated mixed gas introduced by the first-time delivery and the concentrated mixed gas introduced by the second-time delivery come to have a uniform concentration by being temporarily stored in the first concentration vessel 30A so that gas having a more stable ozone concentration can be supplied.

After the first concentration vessel 30A is filled with the concentrated mixed gas, the concentrated mixed gas including ozone is then supplied to a supply destination (step T40). When the valve 82 is opened, the concentrated mixed gas flows out of the first concentration vessel 30A, and reaches the third mass flow controller 43 by way of the pipe 177 and the pipe 185. Thereafter, ozone is supplied to a supply destination through the pipe 186 at a desired flow rate kept by the third mass flow controller 43.

FIG. 4 is referred again. If supply of the ozone gas to a supply destination is finished (YES in the step T50), the ozone concentrating apparatus 1 is deactivated, and concentrating process of the ozone gas is finished. If supply of the ozone gas to a supply destination is not yet finished (NO in the step T50), operations in steps S10 through S40 are repeated.

Although the above statement is directed only to the example in the first concentration vessel 30A as a representative example, the above-described cycle of steps S10 through S50 is performed in each of the first concentration vessel 30A, the second concentration vessel 30B, and the third concentration vessel 30C. The cycles of steps T10 through T50 in the adsorption vessels are performed at shifted timings in each adsorption vessel so that concentrated mixed gas can be supplied with minimized standby time.

With reference to FIG. 5, a temporal relationship for controlling the concentration vessels will be described. First, in a period from time $t_{10}$ to time $t_{12}$, the step T10 of reducing the pressure in the concentration vessel is performed. At this time, the supplying step T40 of supplying concentrated mixed gas to a supply destination is performed in the second concentration vessel 30B. After a lapse of a standby time from time $t_{10}$ to time $t_{11}$, the step T30 of performing second-time delivery of the concentrated mixed gas is performed in the third concentration vessel 30C in a period from time $t_{11}$ to time $t_{12}$. The concentrated mixed gas then introduced into the third concentration vessel 30C is gas delivered from the second adsorption vessel 20B in the same period (step S30).

In a period from time $t_{12}$ to time $t_{13}$, the step T20 of performing first-time delivery of the concentrated mixed gas is performed in the first concentration vessel 30A. The concentrated mixed gas then introduced into the first concentration vessel 30A is gas delivered from the second adsorption vessel 20B in the same period (step S40). Thereafter, after a lapse of a standby time from time $t_{13}$ to time $t_{14}$, the step T30 of performing second-time delivery of the concentrated mixed gas is performed in a period from time $t_{14}$ to time $t_{15}$. The concentrated mixed gas then introduced into the first concentration vessel 30A is gas delivered from the third adsorption vessel 20C in the same period (step S30). At the time $t_{15}$, first and second-time deliveries of the concentrated mixed gas are finished in the first concentration vessel 30A, and the first concentration vessel 30A is filled with the concentrated mixed gas.

Meanwhile, in a period from time $t_{12}$ to time $t_{15}$, the step T10 of reducing the pressure in the concentration vessel is performed in the second concentration vessel 30B. Furthermore, the step T40 of supplying the concentrated mixed gas to a supply destination is performed in the third concentration vessel 30C.

In a period from time $t_{15}$ to time $t_{18}$, the step T40 of supplying the concentrated mixed gas filled in the first concentration vessel 30A to a supply destination is performed in the first concentration vessel 30A. In the second concentration vessel 30B, the step T20 of performing first-time delivery of the concentrated mixed gas and the step T30 of performing second-time delivery of the concentrated mixed gas are performed (where a standby time from time $t_{16}$ to time $t_{17}$ is included between these steps). In the third concentration vessel 30C, supply of the concentrated mixed gas is finished at time $t_{15}$, and then the step T10 of reducing the pressure in the concentration vessel is performed from time $t_{15}$ to time $t_{18}$.

When supply of the concentrated mixed gas from the first concentration vessel 30A is finished at time $t_{18}$, the step T10 of reducing the pressure in the concentration vessel is performed from time $t_{18}$ to time $t_{19}$, and back to the start of the cycle, from time $t_{10}$ to time $t_{12}$. In the second concentration vessel 30B, the supply step T40 of supplying concentrated mixed gas to a supply destination is performed from time $t_{18}$ to time $t_{19}$, and back to the start of the cycle, from time $t_{10}$ to time $t_{12}$. In a period from time $t_{18}$ to time $t_{19}$, the step T20 of performing a first-time delivery of the concentrated mixed gas is performed in the third concentration vessel 30C. Thereafter, this cycle is repeated until completion of supply of concentrated mixed gas to a supply destination.

FIG. 5 is now referred. When attention is paid to the step T40 of supplying the concentrated mixed gas to a supply destination, it is found that the step T40 is performed in one of the concentration vessels at any point of time in a period from time $t_{10}$ to time $t_{19}$. That is, the concentrated mixed gas including ozone can be continuously supplied with minimized standby time in the first embodiment.

Second Embodiment

1. Configuration of an Apparatus for Concentrating Ozone Gas

Figure 6:
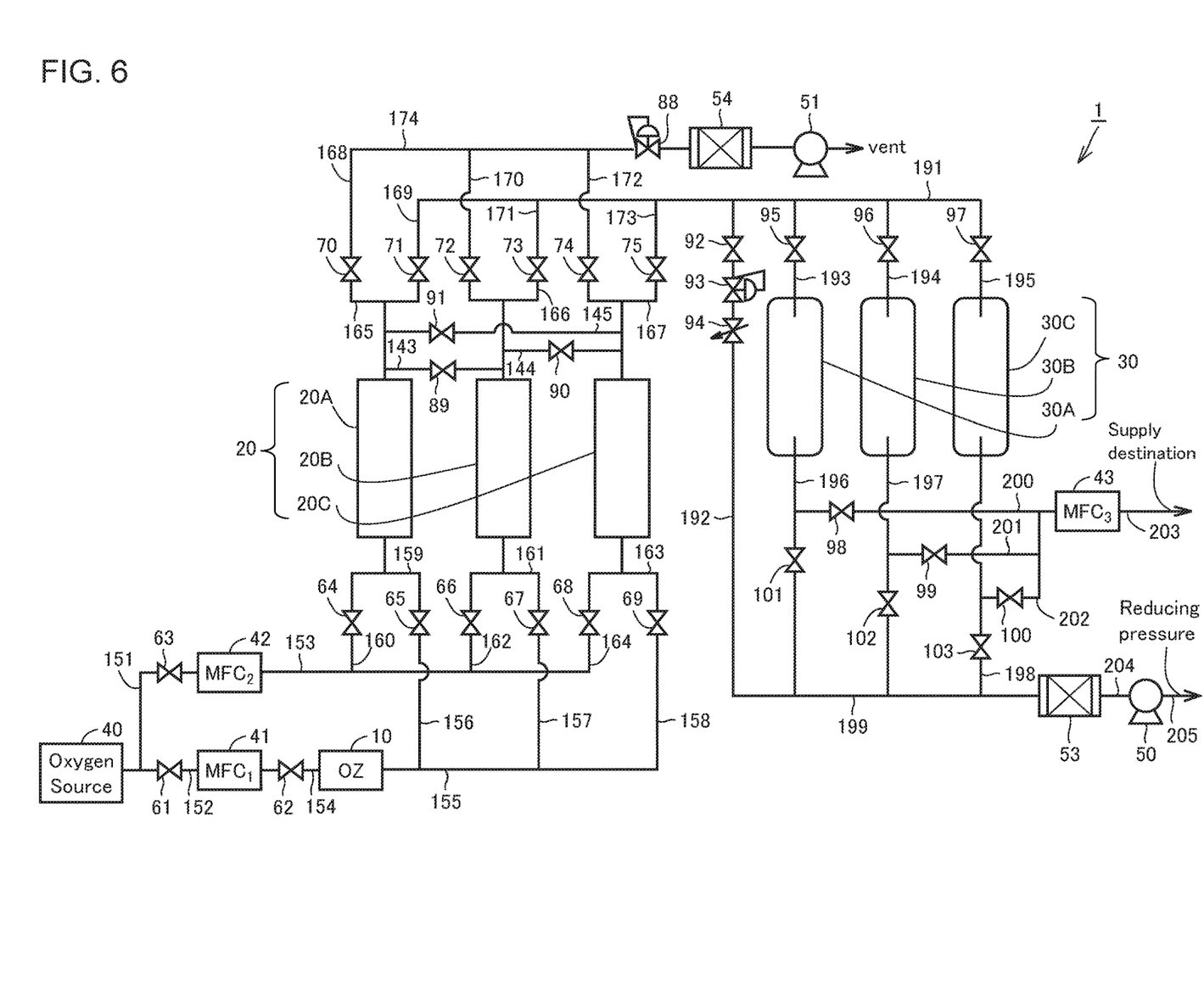
FIG. 6 is a schematic view illustrating a representative configuration of an apparatus for concentrating ozone gas according to a second embodiment.

The apparatus for concentrating ozone gas according to a second embodiment has the same structure as the first embodiment except that the structure from the pipe 191 to the ozone gas outlet disposed downstream of pipes 169, 171, and 173 in FIG. 6 is different. The apparatus for concentrating ozone gas according to the second embodiment includes three adsorption vessels and three concentration vessels in a manner similar to the apparatus for concentrating ozone gas according to the first embodiment. Hereinafter, some features different from those in the case of the first embodiment will be described below.

With reference to FIG. 6, the apparatus for concentrating ozone gas according to the second embodiment includes the pipe 191 connected to the pipe 169, the pipe 171, and the pipe 173. The pipe 191 is connected to a pipe 192, a pipe 193, a pipe 194, and a pipe 195.

The pipe 192 is provided with a valve 92, a back pressure valve 93, and a throttle valve 94. The back pressure valve 93 and the throttle valve 94 control the pressure and the flow rate, respectively, of concentrated mixed gas during desorption of ozone gas.

The pipe 193 is provided with a valve 95. The pipe 193 is disposed so as to extend to the inside of the first concentration vessel 30A. The pipe 194 is provided with a valve 96. The pipe 194 is disposed so as to extend to the inside of the second concentration vessel 30B. The pipe 195 is provided with a valve 97. The pipe 195 is disposed so as to extend to the inside of the third concentration vessel 30C.

The pipe 196 is disposed so as to extend from the inside to the outside of the first concentration vessel 30A. The pipe 193 is provided with a valve 101. The pipe 197 is disposed so as to extend from the inside to the outside of the second concentration vessel 30B. The pipe 197 is provided with a valve 102. The pipe 198 is disposed so as to extend from the inside to the outside of the third concentration vessel 30C. The pipe 198 is provided with a valve 103. The pipe 196, the pipe 197, and the pipe 198 are connected to the pipe 199.

The pipe 199 is provided with an ozone decomposer 53 and a pump 50 for reducing the pressure in a concentration vessel. The pump 50 for reducing the pressure in a concentration vessel is connected to a pipe 205. The pipe 205 constitutes an exhaust pipe for exhausting an atmosphere in the concentration vessel 30A, 30B, or 30C during reduction of the pressure in the vessel. The ozone decomposer 53 decomposes ozone included in the exhausted atmosphere, and prevents distribution of ozone in pump 50 for reducing the pressure in a concentration vessel. The ozone decomposer 53 and the pump 50 for reducing the pressure of a concentration vessel are connected to each other via a pipe 204.

The pipe 196 is connected to a pipe 200. The pipe 200 is provided with a valve 98. The pipe 197 is connected to a pipe 201. The pipe 198 is connected to a pipe 202. The pipe 201 and the pipe 202 are connected to the pipe 200.

The pipe 200 is connected to a third mass flow controller 43. The third mass flow controller 43 is connected to a pipe 203. The pipe 203 is connected to a discharge outlet for discharging ozone gas to a supply destination to which ozone is to be supplied. When such a configuration is adopted, concentrated mixed gas including ozone can be continuously supplied with minimized standby time in a manner similar to the first embodiment.

2. Method for Concentrating Ozone Gas

Flows for controlling adsorption vessels and concentration vessels are the same as those for control in the first embodiment. Thus, constitutions already explained above will not be repeated hereinafter.

In the embodiments described above, examples of the apparatus for concentrating ozone gas used in the method for concentrating ozone gas according to the present invention have been described. Configurations as illustrated in FIGS. 1, 6, and 7 are, however, merely examples, and the apparatus for concentrating ozone gas according to the present invention is not limited to such configurations. For example, arrangement of adsorption vessels and concentration vessels, arrangement of pipes, and arrangement of valves can be appropriately changed in consideration of easiness of construction and the space where the device is to be installed, as long as the present invention can be practically carried out. The numbers of adsorption vessels and concentration vessels are not limited. The number of adsorption vessels may not coincide with the number of concentration vessels. For example, the apparatus for concentrating ozone gas according to the present invention may include concentration vessels in a number larger than the number of adsorption vessels. By setting the number of concentration vessels to be larger than the number of adsorption vessels, concentrated mixed gas can be efficiently delivered to the concentration vessel with minimized standby time after the finish of an adsorbing step in the adsorption vessel.

In the above embodiments, concentrated mixed gas including high concentration ozone may be repeatedly introduced into the concentration vessels 30 to collect high-concentration ozone gas. Specifically, gas is exhausted in the first-time exhausting step S20 or U20 such that the pressure in the adsorption vessel 20 is sufficiently low, for example, −90 kPa·G or less, to obtain concentrated mixed gas including high concentration ozone gas. The resulting concentrated mixed gas is introduced into the concentration vessel 30 (e.g., the first concentration vessel 30A), and then, introductions are repeated multi-times while gradually increasing the pressure in the adsorption vessel 20 in the exhaust step so that high-concentration ozone gas can be collected at a higher pressure.

It should be understood that the embodiments herein disclosed are to be regarded as illustrative and rather than restrictive in all aspects. The scope of the present invention is defined by the terms of the claims, rather than the explanation described above. All changes which come within the meaning and range of equivalency of the claims are to be encompassed in the scope of the present invention.

INDUSTRIAL APPLICABILITY

The method for concentrating ozone gas and the apparatus for concentrating ozone gas according to the present invention can be especially advantageously applicable to a method for concentrating ozone gas and an apparatus for concentrating ozone gas, which may cause a problem on ozone resistance of a portion which can come into contact with ozone in a pump.

REFERENCE NUMERALS

1: Apparatus for concentrating ozone, 10: Ozone generator, 20: Adsorption vessel, 20A: First adsorption vessel, 20B: Second adsorption vessel, 20C: Third adsorption vessel, 30: Concentration vessel, 30A: First concentration vessel, 30B: Second concentration vessel, 30C: Third concentration vessel, 40: Oxygen source, 41: First mass flow controller, 42: Second mass flow controller, 43: Third mass flow controller, 50: Pump for reducing the pressure in a concentration vessel, 51: Exhaust pump, 53: Ozone decomposer, 54: Ozone decomposer, 61, 62, 63, 64, 65, 66, 67, 68, 69, 70, 71, 72, 73, 74, 75, 76, 77, 78, 79, 80, 81, 82, 83, 84, 85: Valves, 86: Back pressure valve, 87: Throttle valve, 88: Back pressure valve, 89, 90, 91, 92: Valves, 93: Back pressure valve, 94: Throttle valve, 95, 96, 97, 98, 99, 100, 101, 102, 103: Valves, 143, 144, 145, 151, 152, 154, 155, 156, 157, 158, 159, 160, 161, 162, 163, 164, 165, 166, 167, 168, 169, 170, 171, 172, 173, 174, 175, 191, 192, 193, 194, 195, 196, 197, 198, 199, 200, 201, 202, 203, 204, 205: pipes.

The invention claimed is:

1. An apparatus for concentrating ozone gas, comprising:
first and second adsorption vessels each house an adsorbent for adsorbing ozone gas from ozone gas-containing raw material mixed gas introduced thereinto;
a first concentration vessel connected to both of the first and the second adsorption vessels;
a first pressure-reducing device connected to the first concentration vessel and is capable of reducing pressure in the first concentration vessel and creating a pressure difference between the first and second adsorption vessels and the first concentration vessel without heating the first or second adsorption vessels; and
a channel control device to switch modes of communication states of the first and the second adsorption vessels, the first concentration vessel, and the first pressure-reducing device, wherein
the channel control device switches
a mode for allowing ozone gas to be adsorbed onto an adsorbent in the first adsorption vessel by introducing raw material mixed gas that includes ozone gas into the first adsorption vessel that houses an adsorbent;
a mode for reducing pressure in the first concentration vessel in a state where the first concentration vessel does not communicate with the first and second adsorption vessels;
a mode for discharging part of gas in the first adsorption vessel that houses the adsorbent onto which ozone gas is adsorbed by exhausting gas in the first adsorption vessel to the outside;
a mode for introducing concentrated mixed gas including ozone gas with a higher ozone gas concentration than the raw material mixed gas into the first concentration vessel by desorbing ozone gas adsorbed onto the adsorbent in the first adsorption vessel using the pressure difference between the first concentration vessel with reduced internal pressure and the first adsorption vessel from which part of gas therein is discharged in a state where the first concentration vessel communicates with the first adsorption vessel, and then delivering the desorbed ozone gas into the first concertation vessel;
a mode for allowing ozone gas to be adsorbed onto an adsorbent in the second adsorption vessel by introducing raw material mixed gas that includes ozone gas into the second adsorption vessel that houses an adsorbent; and
a mode for introducing a second concentrated mixed gas including ozone gas with an ozone gas concentration that is lower than that of the first concentrated mixed gas into the first concentration vessel but is higher than that of the raw material mixed gas by desorbing ozone gas adsorbed onto the adsorbent in the second adsorption vessel using the pressure difference between the first concentration vessel into which a first concentrated mixed gas has been introduced and the second adsorption vessel that houses the adsorbent onto which ozone gas is adsorbed in a state where the first concentration vessel communicates with the second adsorption vessel, and then delivering the ozone gas into the first concertation vessel,
the apparatus further comprising
a second concentration vessel that is different from the first concentration vessel; and
a second pressure-reducing device that is connected to the second concentration vessel and is capable of reducing pressure in the second concentration vessel, wherein
the channel control device switches between
a mode for reducing pressure in the second concentration vessel in a state where the second concentration vessel does not communicate with the first and the second adsorption vessels; and
a mode for introducing part of gas in the first adsorption vessel into the second concentration vessel by desorbing ozone gas adsorbed onto the adsorbent in the first adsorption vessel using the pressure difference between the pressure in the second concentration vessel with reduced internal pressure and the first adsorption vessel that houses an adsorbent onto which ozone gas is adsorbed in a state where the second concentration vessel communicates with the first adsorption vessel, and then delivering the desorbed ozone gas into the second concentration vessel.

2. The apparatus according to claim 1, further comprising:
an exhaust path that is connected to the first adsorption vessel and is used for exhausting gas in the first adsorption vessel to the outside while preventing the gas from reaching the first concentration vessel.

3. A method for concentrating ozone gas using the apparatus for concentrating ozone gas according to claim 1, comprising the steps of:
allowing ozone gas to be adsorbed onto the adsorbent in the first adsorption vessel by introducing raw material mixed gas that includes ozone gas into the first adsorption vessel that houses the adsorbent;
reducing pressure in the first concentration vessel in the state where the first concentration vessel does not communicate with the first adsorption vessel;
discharging part of gas in the first adsorption vessel that houses the adsorbent onto which ozone gas is adsorbed by exhausting an atmosphere in the first adsorption vessel to the outside;
introducing the first concentrated mixed gas including ozone gas with a higher ozone gas concentration than the raw material mixed gas into the first concentration vessel by desorbing ozone gas adsorbed onto the adsorbent in the first adsorption vessel using pressure difference between the first concentration vessel with reduced internal pressure and the first adsorption vessel from which part of gas therein is discharged the state where the first concentration vessel communicates with the first adsorption vessel and then delivering the desorbed ozone gas into the first concertation vessel;
allowing ozone gas to be adsorbed onto the adsorbent in the second adsorption vessel by introducing ozone-gas containing raw material mixed gas into the second adsorption vessel that is different from the first adsorbent and houses the adsorbent; and
introducing the second concentrated mixed gas including ozone gas with an ozone gas concentration that is lower than that of the first concentrated mixed gas but is higher than that of the raw material mixed gas into the first concentration vessel by desorbing ozone gas adsorbed onto the adsorbent in the second adsorption vessel using the pressure difference between the first concentration vessel into which the first concentrated mixed gas has been introduced and the second adsorption vessel that houses the adsorbent onto which ozone gas is adsorbed in the state where the first concentration vessel communicates with the second adsorption vessel, and then delivering the ozone gas into the first concertation vessel.

4. The method according to claim 3, wherein
the step of discharging part of gas in the first adsorption vessel includes exhausting gas to the outside while preventing the gas in the first adsorption vessel from reaching the first concentration vessel.

5. The method according to claim 4, wherein
the step of discharging part of the gas in the first adsorption vessel includes discharging part of gas in the first adsorption vessel that houses the adsorbent onto which the ozone gas is adsorbed by allowing the first adsorption vessel to be opened to the outside air.

6. The method according to claim 4, wherein
the step of discharging part of gas in the first adsorption vessel includes discharging part of gas in the first adsorption vessel that houses the adsorbent onto which the ozone gas is adsorbed such that pressure in the first adsorption vessel should be —80 kPa·G or less while preventing the part of gas from reaching the first concentration vessel.

7. The method according to claim 3, further comprising:
a step of reducing pressure in the second concentration vessel that is different from the first concentration vessel in a state where the second concentration vessel does not communicate with either of the first and the second adsorption vessels, wherein
the step of discharging part of gas in the first adsorption vessel includes
a step of introducing the part of gas in the first adsorption vessel into the second concentration vessel by desorbing ozone gas adsorbed onto the adsorbent in the first adsorption vessel using the pressure difference between the pressure in the second concentration vessel with reduced internal pressure and the first adsorption vessel that houses an adsorbent onto which ozone gas is adsorbed in a state where the second concentration vessel communicates with the first adsorption vessel, and then delivering the desorbed ozone gas into the second concentration vessel.

8. The method according to claim 3, wherein
the step of introducing the first concentrated mixed gas into the first concentration vessel or the step of introducing the second concentrated mixed gas into the first concentration vessel is performed without heating the first and the second adsorption vessels.

9. The method according to claim 3, wherein the step of discharging part of gas in the first adsorption vessel includes discharging part of gas in the first adsorption vessel that houses an adsorbent onto which the ozone gas is adsorbed into a third adsorption vessel that houses an adsorbent in a state where the first adsorption vessel communicates with the third adsorption vessel.

* * * * *